Dec. 13, 1966   C. GRAY   3,292,030
ELECTRODE ASSEMBLIES FOR SURGE DIVERTERS
Filed June 11, 1964
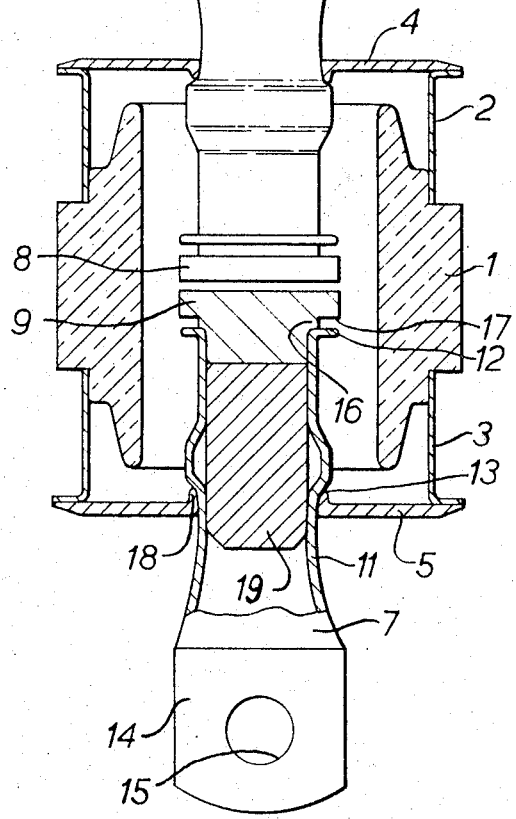
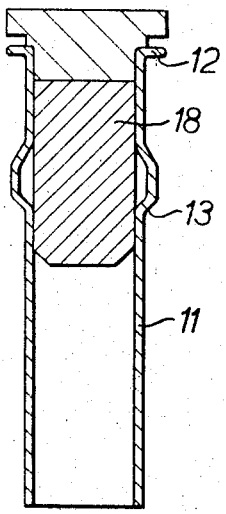
INVENTOR
CYRIL GRAY
By: Norris & Bateman
Attys

United States Patent Office 3,292,030
Patented Dec. 13, 1966

3,292,030
ELECTRODE ASSEMBLIES FOR SURGE DIVERTERS
Cyril Gray, New Barnet, England, assignor to Associated Electrical Industries Limited, London, England, a British company
Filed June 11, 1964, Ser. No. 374,442
Claims priority, application Great Britain, June 26, 1963, 25,449/63
5 Claims. (Cl. 313—244)

The present invention relates to electrode assemblies for surge diverters.

A surge diverter is a high vacuum electrical device comprising an evacuated envelope at least partially formed from electrically insulating material and two electrodes extending within the envelope with their inner ends adjacent. The inner ends of the electrodes are spaced apart by a small gap across which an arc will be formed if a high voltage pulse is applied between the electrodes. Such a device is commonly used as a protective device in electrical equipment in which high voltage surges are experienced and it is desirable to provide a low resistance conducting path for these high voltage surges.

The two electrodes must be sealed to the walls of the envelope through which they extend, and the adjacent inner ends of the electrodes must be located accurately at a predetermined distance apart. Each electrode also must be formed with a terminal portion outside the envelope and these terminal portions need to be adapted for connection to the associated electrical equipment.

An object of the present invention is the provision of a surge diverter having an improved electrode assembly which enables the requirements set out in the last paragraph to be more easily satisfied.

According to the present invention an electrical surge diverter comprises an evacuated envelope, two facing spaced electrodes inside the envelope, and mounting means for each electrode in the form of a tube which has the electrode mounted on one end, and which extends outwardly through the wall of the evacuated envelope, each tube being formed of ductile material.

A contact may be secured to the inner end of each electrode. The outer ends of the tubular electrodes are ararnged to be flattened and punched to provide terminal holes spaced apart accurately by a required amount.

By using a ductile tube for each electrode the fabrication of the surge diverter can be simplified. Thus it is relatively easy to flare the end of a ductile tube to form an arc stopping groove. Also it is relatively easy to form a bulge on the tube to register the inner end an accurate distance from the end plate forming the wall through which the tube extends. Further, it is relatively easy to make a vacuum tight braze between a tubular electrode support and a flat end plate. The most practical material for this electrode support is copper, which has a high coefficient of thermal expansion, while almost any material suitable for an end plate will have a lower coefficient of expansion. It would be very difficult to make a vacuum tight braze to a solid copper electrode, but a ductile tube will deform to take up the difference in expansion.

Also it is relatively easy to deform the outer ends of the electrode support and punch holes in them in one operation, after the device has been sealed off from the vacuum pumps, producing lugs with holes which are accurately spaced and having bolting surfaces which are in the same plane. These lugs being ductile will deform to take up misalignment of the mating bolting faces without unduly stressing the joints of the vacuum envelope.

The invention will now be described by way of example, with reference to the accompanying drawings, in which:

FIGURE 1 is a partly sectioned side elevation on an axial plane of a surge diverter embodying the invention; and FIGURE 2 is a sectional side elevation of one of two electrodes shown in FIGURE 1, as it appears at one stage during its manufacture.

Referring first to FIGURE 1, which illustrates a completely assembled surge diverter, the diverter assembly comprises a stepped cylindrical body portion 1 of ceramic electrically insulating material, two cylindrical metal end rings 2 and 3, made of the nickel-ion-cobalt alloy Nilo=K (Registered Trademark), and two metal end plates 4 and 5 made from mild steel. Suitable seals are provided between these components so that together they form a gas tight envelope enclosing the inner ends of two electrodes 6 and 7 which extend through end plates 4 and 5 respectively in a gas tight manner and are formed with contacts 8 and 9 respectively on their inner ends. The adjacent surfaces of the contacts are spaced a short distance apart.

Each of the electrodes is formed from a tube 11 of ductile material having a high electrical conductivity, oxygen-free high conductivity copper for example. One end of each tube is formed with a flange 12 and aranged to receive the associated contact so that a shoulder on the contact engages the flange 12. Each tube 11 is also formed with an inclined member 13 which butts against the associated end plate and locates the electrode against outward longitudinal movement. The outer end of each tube is flattened at 14 and drilled or punched at 15 in order to provide a suitable terminal for the electrode.

Each of the contacts 8 and 9 is circular in transverse section and fits within the end of the associated tubular electrode. A shoulder 16 is formed in the outer surface of each contact so as to define, in combination with the flange 12, an annular groove 17 which is used to control an arc extending between the contacts.

FIGURE 2 illustrates one of the tubular electrodes at one stage during its manufacture. The electrode is made from a tube 11 of the ductile material and the flange 12 is first formed at one end of the tube. The inclined shoulder 13 is next formed at a predetermined distance from the flange 12. A contact 8 or 9 is then brazed to the flanged end of the tube and the electrode secured by brazing within an aperture in the associated end plate 4 or 5 so that the shoulder 13 abuts against the inner surface of the end plate, which is provided with a flange 18 extending round the associated aperture. Since the flange 12 is accurately spaced from the shoulder 13, the contacting surface of the contact is accurately spaced a predetermined distance from the associated end plate.

In order to assemble the surge diverter the two end rings 2 and 3 are first sealed to the body portion 1 and the two end plates 4 and 5, together with their associated electrodes, are then secured to the end rings 2 and 3 respectively. By constructing all the components to predetermined limits and by accurately assembling the components together, the adjacent surfaces of contacts 8 and 9 will be spaced apart by a predetermined amount. The assembly of components forms an envelope which is then evacuated and sealed.

The two terminals for the electrodes are then formed. An anti-crush block 19 of hard material is inserted within the portion of the electrode extending through the associated end plate. Then the end of each electrode is flattened and punched simultaneously so as to produce the flat portions 14 and holes 15 located a predetermined distance apart at the ends of the electrodes. The anti-crush blocks 19 prevent distortion of the electrode in the region of the seals between the shoulders 13 and the associated end plates and prevents these seals being stressed during the formation of the terminal portions.

During construction of the device the temperature of the electrodes is raised to about 800° C. during the brazing process and to about 500° C. for some hours during the baking out process and this causes the copper to become soft. In the finished assembly the electrodes are so ductile that if there is a minor misalignment of the holes 15 with cooperating holes in the associated equipment, this misalignment can be accommodated without undue stressing of the components and the seals in the device.

What I claim is:

1. An electrical surge diverter for an electrical circuit comprising an envelope enclosing an evacuated space and a pair of substantially axially aligned electrode assemblies extending into said space and being so spaced apart at their adjacent ends within said space as to provide a high voltage gap therebetween, each of said assemblies comprising a tube extending through said envelope, means providing a fluid tight seal between said tube and said envelope, a radially outwardly extending flange formed integral with said tube at the inner end thereof within said envelope, a cylindrical electrode having one end coaxially and interfittingly received in the inner end of said tube and being formed with an annular land that is seated against said flange, said electrode having an end section disposed beyond the inner end of said tube, with the end face of said end section delimiting said gap, an annular positioning shoulder formed integral with said tube in predetermined, axially spaced relation from said flange, said positioning shoulder being disposed within said envelope and facing towards the outer end of said tube, an annular portion formed on said envelope within said space in interfitting circumferentially surrounding relation to said tube in the region where it passes through said envelope, said annular shoulder being axially seated against said annular portion to positively locate said end face within said space, and an electrical terminal formed integral with the outer end of said tube protruding beyond said envelope, the terminals for both of said assemblies being adapted for connection in said circuit to provide an electrical current conducting path between said assemblies and passing serially through the tube and electrode of each assembly.

2. The electrical surge diverter defined in claim 1 wherein said envelope is formed with a pair of axially opposed, spaced apart end plates through which the tubes of said assemblies respectively extend, each annular portion being integral with one of said plates, said positioning shoulder being formed by a diametrically enlarged bulge in said tube.

3. The electrical surge diverter defined in claim 2 wherein said terminal in each assembly is formed by flattening the outer end of said tube to close the outer end thereof, and wherein a rigid cylindrical member is interfittingly received within said tube to provide a peripheral support for the region of said tube passing through its associated end plate.

4. An electrical surge diverter comprising:
 (a) an annular body of electrically insulating material;
 (b) a first metal end closure secured in an air-tight relation to and closing one end of the annular body;
 (c) a second metal plate secured in an air-tight relation to and closing the second end of the annular body;
 (d) said annular body and said first and second end closures defining an envelope delimiting an evacuated space;
 (e) a first electrode inside the evacuated space;
 (f) a second electrode inside the evacuated space, spaced from and facing the first electrode;
 (g) a first tube of ductile metal extending through the first metal end closure, and being sealed thereto;
 (h) a first solid metal electrode tip in the inner end of the first tube and accurately positioned by that inner end;
 (i) a first circumferentially continuous peripheral bulge provided on the part of the first tube which is immediately inside the first end closure and so engaging that end closure as to locate the tube and thus the electrode tip accurately with respect to the end closure;
 (j) a second tube of ductile metal extending through the second metal end closure, and being sealed thereto;
 (k) a second solid metal electrode tip in the inner end of the second tube and accurately positioned by that inner end; and
 (l) a second circumferentially continuous peripheral bulge provided on the part of the second tube which is immediatley inside the second end closure and so engaging that end closure as to locate the tube and thus the contact tip accurately with respect to the end closure.

5. The electrical surge diverter defined in claim 1, in which:
 (a) each solid electrode tip is provided with a cylindrical part which extends within the associated tube;
 (b) the inner end of each tube has an outwardly extending flange;
 (c) each solid electrode tip is provided with an axially facing shoulder which engages the flange on the inner end of the associated tube; and
 (d) the outer edge of each tip and the outer edge of each flange are spaced apart to form an arc-stopping circumferential groove.

References Cited by the Examiner

UNITED STATES PATENTS

| | | | |
|---|---|---|---|
| 1,057,016 | 3/1913 | Tornberg | 313—311 X |
| 1,422,439 | 7/1922 | Halvorson | 313—331 |
| 1,995,055 | 3/1935 | Depuddicombe | 313—214 X |
| 2,451,184 | 10/1948 | Watrous | 313—214 |
| 3,102,968 | 9/1963 | Waterton | 313—311 |
| 3,119,040 | 1/1964 | Gardiner et al. | 313—311 |
| 3,210,588 | 10/1965 | Demurjian | 313—231 |

FOREIGN PATENTS

| | | |
|---|---|---|
| 126,873 | 3/1948 | Australia. |
| 645,348 | 11/1950 | Great Britain. |
| 750,211 | 6/1956 | Great Britain. |

JOHN W. HUCKERT, *Primary Examiner.*

A. J. JAMES, *Assistant Examiner.*